US006502750B1

(12) United States Patent
Barnes et al.

(10) Patent No.: US 6,502,750 B1
(45) Date of Patent: Jan. 7, 2003

(54) SCANNING BEAM SYSTEM AND METHOD FOR READING INFORMATION SYMBOLS

(75) Inventors: Danny S. Barnes, Maple Valley, WA (US); Matthew E. Allen, Maple Valley, WA (US)

(73) Assignee: Microscan Systems, Inc., Renton, WA (US)

(*) Notice: Subject to any disclaimer, the term of this patent is extended or adjusted under 35 U.S.C. 154(b) by 0 days.

(21) Appl. No.: 09/449,169

(22) Filed: Nov. 24, 1999

(51) Int. Cl.[7] .................. G06K 7/10; G11B 5/09; G11B 7/10
(52) U.S. Cl. .................. 235/462.01; 235/462.19; 235/462.25
(58) Field of Search .................. 235/462.07, 462.19, 235/462.2, 462.21, 462.25, 462.32, 462.33, 385, 383, 462.01

(56) References Cited

U.S. PATENT DOCUMENTS

| | | | | |
|---|---|---|---|---|
| 3,745,354 A | * | 7/1973 | Vargo | 235/462.02 |
| 3,949,363 A | | 4/1976 | Holm | 340/146.3 |
| 4,877,948 A | | 10/1989 | Krueger | 235/449 |
| 5,452,379 A | | 9/1995 | Poor | 382/317 |
| 5,481,096 A | * | 1/1996 | Hippenmeyer et al. | 235/454 |
| 5,525,788 A | * | 6/1996 | Bridgelall et al. | 235/462.08 |
| 6,016,961 A | * | 1/2000 | Hippenmeyer et al. | 235/462.08 |
| 6,135,352 A | * | 10/2000 | Girotti | 235/454 |
| 6,325,289 B1 | * | 12/2001 | Mazzone | 235/462.14 |

* cited by examiner

Primary Examiner—Karl D. Frech
Assistant Examiner—April Nowlin
(74) Attorney, Agent, or Firm—Blakely Sokoloff Taylor & Zafman LLP

(57) ABSTRACT

A scanning system and method reads information symbols, such as optical mark recognition ("OMR") symbols. Each OMR symbol typically includes a predetermined number of cells, with each cell containing a bar or a space. An object detector detects the presence of an object having an affixed OMR symbol and generates a trigger signal indicating an object has been detected. The object is typically moving past the scanning system and the trigger signal provides timing information for the system so the objects are scanned at the proper times. In response to the trigger signal, a scanner, such as a laser scanning device, scans and decodes the OMR symbol. The laser scanner includes an optical transmitter that generates a scanning laser beam that scans each OMR symbol when the symbol is within a scan window. An optical detector in the scanner is positioned to receive optical energy reflected from each OMR symbol responsive to the scanning laser beam. The optical detector generates a detection signal responsive to the received optical energy. A processing circuit is coupled to the optical transmitter and the optical receiver. The processing circuit processes the detection signal for a corresponding information symbol within the scan window to thereby read the information symbol.

37 Claims, 10 Drawing Sheets

SCANNING BEAM SYSTEM AND METHOD FOR READING INFORMATION SYMBOLS

TECHNICAL FIELD

The present invention relates generally to reading and decoding information symbols, and more specifically to a laser scanning system and method for reading information symbols such as optical mark recognition symbols.

BACKGROUND OF THE INVENTION

Machine readable information labels or codes, such as bar codes, are ubiquitous in today's world. Bar codes are utilized for myriad different purposes, being affixed to many consumer products to identify the cost of the products, and being utilized in industry to identify components during manufacture and items stored in inventory. A bar code consists of a series of bars and spaces of varying widths formed according to a set of rules to thereby encode data, as will be understood by those skilled in the art. In addition to bar codes, other types of machine readable codes are utilized in particular industries to encode machine readable data. One such code is known as Optical Mark Recognition ("OMR") symbology, which is utilized in the document handling industry to encode data in OMR symbols that are affixed to documents. The document handling industry includes such companies as Xerox, Hewlett-Packard, and Pitney Bowes, which utilize OMR symbols to encode geographic regions or zip codes for use in sorting the corresponding documents.

FIG. 1 illustrates a conventional OMR scanning system 10 including an OMR symbol 11 and an optical sensor 38 for reading the OMR symbol, as will be explained in more detail below. The OMR symbol 11 includes a plurality of cells 12–26 arranged as shown, each cell 12–26 containing a single bit of binary data represented by either a corresponding mark or bar in the cell, or a space in the cell. In the OMR symbol 11, the cells 12, 16, 20, and 24 include bars 28, 30, 32, and 34, respectively, while cells 14, 18, 22, and 26 include spaces (i.e., no bar). Typically, each of the bars in the cells 12, 16, 20, and 24 represents a binary 1, and each of the spaces in the cells 14, 18, 22, in 26 represents a binary 0. Although the OMR symbol 11 is shown having the eight cells 12–26, the number of cells in an OMR symbol may vary, with there typically being between 8–32 cells in a symbol.

In a typical application, the OMR symbol 11 is attached to an object, such as a letter or package, and contains bars and spaces in the cells 12–26 to encode the desired data. The object is typically placed on a conveyor belt (not shown) and is thus moving at a velocity $V_O$ relative to the optical sensor 38. The optical sensor 38 applies incident optical energy 40 to each cell 12–26 of the OMR symbol 11 as that cell passes by the sensor. As each cell 12–26 passes by the optical sensor 38 moving at the velocity $V_O$, the sensor 38 senses optical energy reflected from the cell 12–26 to thereby detect the presence of a bar or space in each of the cells. In FIG. 1, the ONR symbol 11 a shown positioned with the cell 18 being illuminated by the optical energy 40 from the sensor 38. As understood by those skilled in the art, the presence of a bar in a cell results in optical energy being absorbed when incident optical energy is applied to that cell, while a space (no bar) results in optical energy being reflected when incident optical energy is applied to the cell. Thus, in FIG. 1, the optical sensor 38 detects optical energy being reflected from the cell 18, indicating that the cell 18 cell contains a space. From the detected bars and spaces in each of the cells 12–26, the optical sensor 38 generates binary data corresponding to the decoded OMR symbol 11, each bit in the binary data corresponding to one of the cells 12–26 in the OMR symbol.

The optical sensor 38 is typically an LED sensor or a fixed-beam laser type device, as will be understood by those skilled in the art. Such devices may have difficulties dealing with so-called "paper flutter" of the OMR symbol 11 which occurs when the document to which the OMR symbol is affixed moves towards or away from the LED sensor or fixed-beam laser. Moreover, poor contrast between bars in the OMR symbol 11 and the surface to which the symbol is affixed also presents difficulties for the LED and fixed-beam laser type devices. In addition, LED and fixed-beam laser type devices cannot read OMR symbols in "ladder" orientations. As will be understood by those skilled in the art, information symbols are typically read in either a ladder or picket fence orientation. A ladder orientation results when the lengths of the bars in the OMR symbol are parallel to the symbols direction of travel, and a "picket fence" orientation occurs when the lengths of the bars in the OMR symbol are perpendicular to the direction of travel (as depicted in FIG. 1).

In contrast to the LED and fixed-beam laser type devices, laser scanners are less affected by poor symbol contrast or paper flutter, and can read OMR symbols in either picket fence or ladder orientations. A laser scanner directs a laser spot across a scan window containing a bar code label. As the laser spot travels across the scan window SW, the laser scanner detects reflected optical energy from a bar code label contained within the scan window and utilizes this reflected optical energy to decode the bar code label. Due to the physical construction of the laser scanner, the velocity of the laser spot, which is known as the "spot" velocity, varies as the laser spot travels across the scan window. During normal operation of a laser scanner in reading bar code labels, the varying spot velocity does not result in difficulties in reading the labels. This is true because the predictable characteristics of bar code labels that allow for compensation of the varying spot velocity during decoding, When a laser scanner is utilized to read OMR symbols moving relative to the laser scanner, however, difficulties arise in reliably reading such labels due to the varying spot velocity of the laser spot. The operation and characteristics of laser scanners will be understood by those skilled in the art, and thus a detailed description of such operation and characteristics has been omitted for the sake of brevity.

Referring to FIG. 1, the line 36 represents the path of a laser spot from a laser scanner during scanning of the OMR symbol 11. The spot velocity of the laser is designated Vs, and the length of the line 36 from left to right corresponds to the scan window SW of the laser scanner. The spot velocity $V_S$ varies across the scan window SW due to the planar surface of the OMR symbol 11 truncating an arced path of the laser beam, as will be understood by those skilled in the art. If it was attempted to read the OMR symbol 11 with a laser scanner, the varying spot velocity $V_S$ and velocity $V_O$ of the symbol 11 result in difficulties in decoding the symbol. For example, the spot velocity $V_S$ is slower towards the center of the scan window SW. Thus, the slower spot velocity $V_S$ combined with the symbol velocity $V_O$ result in the laser beam illuminating the interior cells 18 and 20 for a longer duration than the cells 12–16 and 22–26. In decoding an OMR symbol, a valid bar is typically detected by reflected optical energy for at least a predetermined time. Due to the variable spot velocity $V_S$, this predetermined time will be longer for the interior cells 18, 20 than for the exterior cells 12–16 and 22–26, thereby making the detection and decoding of the OMR symbol 10 difficult.

The variable spot velocity $V_S$ in combination with the variable or "free-form" nature of OMR symbols has precluded reliable decoding of the symbols using laser scanners. OMR symbols are free-form in that only the first cell in an OMR symbol must contain a bar, known as a "gate" bar, and all other cells may contain either bars or spaces. In FIG. 1, the bar 28 in cell 12 may be the gate bar, and all other cells 14–26 may contain any combination of bars and spaces. This free-form format of OMR symbols makes it difficult to detect where a first OMR symbol ends and where a second symbol begins, and also makes it difficult to detect spaces and bars within each symbol, as will be appreciated by those skilled in the art.

There is a need for a laser scanning system that reliably senses and decodes free-form information symbols such as OMR symbols.

SUMMARY OF THE INVENTION

A scanning system and method reads information symbols, such as optical mark recognition ("OMR") symbols. Each symbol includes a number of cells, with each cell containing a bar or a space. According to one aspect of the present invention, a symbol scanning device includes an optical transmitter that generates a scanning beam that scans each symbol when the symbol is within a scan window. An optical detector in the scanner is positioned to receive optical energy reflected from each symbol responsive to the scanning beam. The optical detector generates a detection signal responsive to the received optical energy. A processing circuit is coupled to the optical transmitter and the optical receiver. The optical transmitter scans a symbol within the scan window, and the processing circuit thereafter processes the corresponding detection signal from the optical detector to read the scanned symbol. The optical transmitter may be a scanning laser.

DETAILED DESCRIPTION OF THE INVENTION

Figure 1:
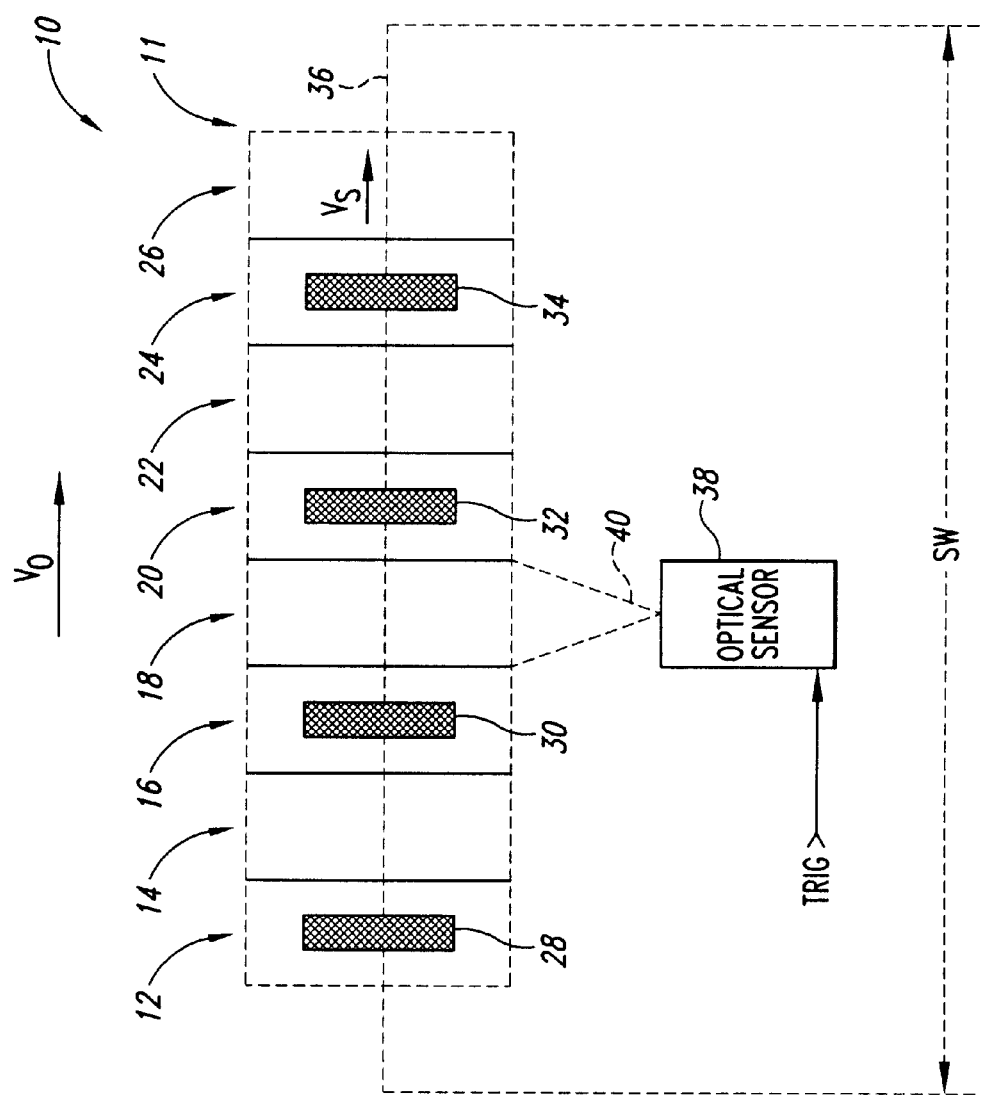
FIG. 1 is a diagram of a conventional optical mark recognition (OMR) system including an LED or fixed-beam laser device for reading OMR symbols.
Figure 2:
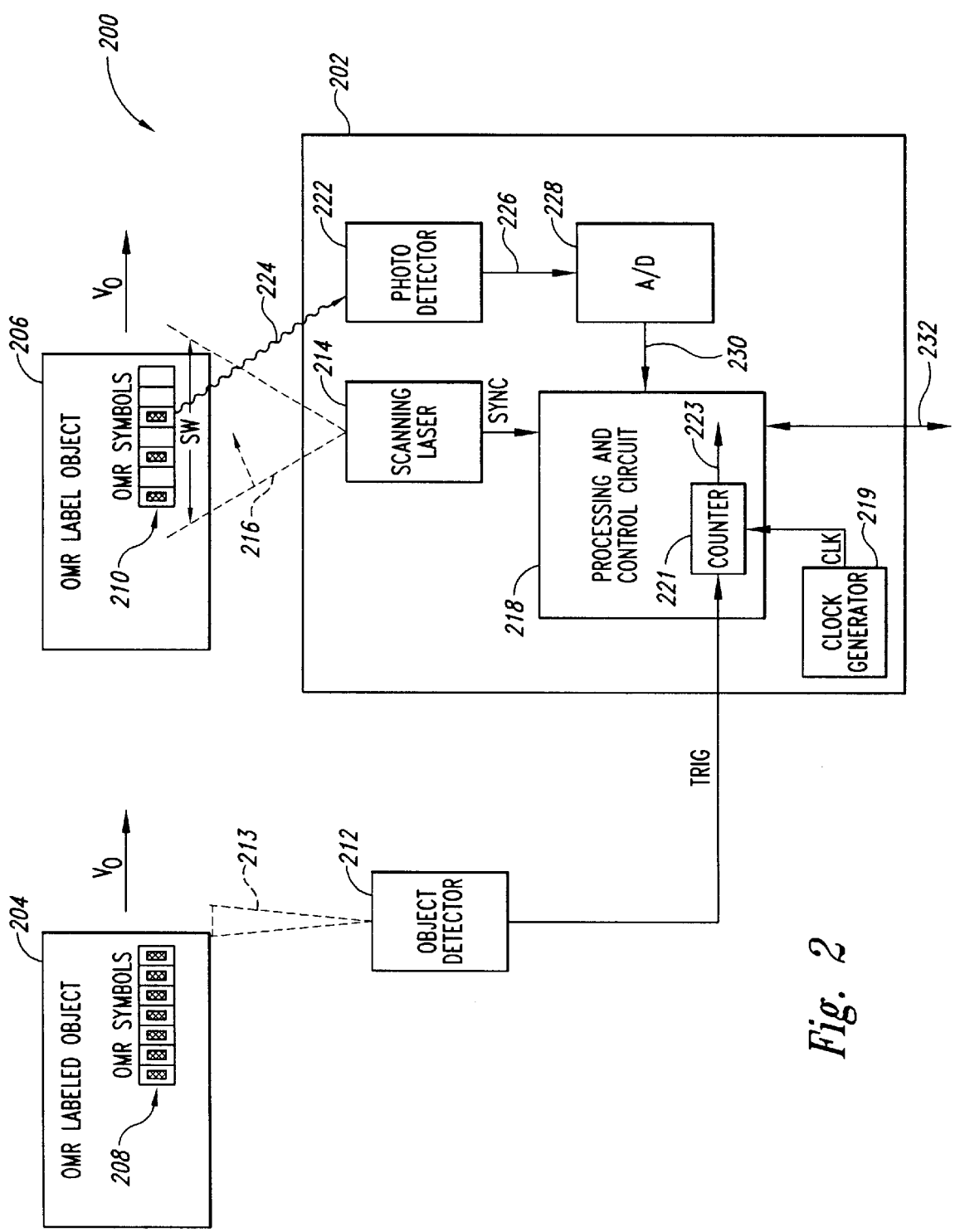
FIG. 2 is a functional block diagram of a laser scanning system for reading optical mark recognition symbols according to one embodiment of the present invention.

FIG. 2 is a functional block diagram of an optical mark recognition system 200 including a laser scanner 202 for reading optical mark recognition ("OMR") symbols according to one embodiment of the present invention. Although the system 200 is described as reading OMR symbols, one skilled in the art will realize that aspects of the present invention as described through the disclosed embodiment of FIG. 2 may also be applied in reading and decoding other types of information symbols.

In the system 200, two objects 204 and 206 containing OMR symbols 208 and 210, respectively, are shown traveling at a velocity $V_O$ relative to the laser scanner 202. An object detector 212 transmits energy 213, such as optical energy, and receives reflected energy from an object in the path of the transmitted energy to detect the labeled objects 204, 206 as they move past the object detector. More specifically, when the object 204, 206 is in the path of the transmitted energy 213, some of this energy is reflected and received by the object detector 212. In response to the reflected energy, the object detector 212 generates a trigger signal TRIG indicating an object to be scanned is approaching the laser scanner 202. The TRIG signal, in conjunction with an encoder pulse or a timer in a processing and control circuit 218, allows each scan of the laser scanner 202 to be timed stamped with a time valve relative to a transition of the TRIG signal, as will be described in more detail below. The object detector 212 may also be formed from other known configurations, such as a mechanical switch that is positioned to "close" or "open" whenever an object passes by the switch, as will be appreciated by those skilled in the art. In operation, when the object detector 212 detects an object to be scanned it applies the TRIG signal to the laser scanner 202 which, in response to the TRIG signal, reads (i.e., scans and decodes) the OMR symbol affixed to the corresponding object, as will be explained in more detail below.

The laser scanner 202 includes a laser scanning device 214 that generates a scanning laser spot 216 that travels across a scan window SW to illuminate an OMR symbol contained within the scan window. In FIG. 2, the beam 216 scans the OMR symbol 210 contained within the scan window SW. As will be understood by those skilled in the art, the laser scanning device 214 continually scans the scan window SW with the laser spot 216. The device 214 generates a synchronization signal SYNC that indicates the start and stop of each scan of the laser spot 216. A photo detector 222, such as a photo diode, receives reflected optical energy 224 from the OMR symbol 210 illuminated by the scanning laser spot 216. The photo detector 222 must be physically positioned to receive the reflected optical energy 224, and is shown next to the laser 214 merely for ease of illustration. The photo detector 222 generates an analog electrical signal 226 in response to the received reflected optical energy 224, and applies the electrical signal 226 to an analog-to-digital (A/D) converter 228. The analog-to-digital converter 228 samples the electrical signal 226 to generate a digital signal 230 that represents the analog electrical signal 226, as will be understood by those skilled in the art.

A processing and control circuit 218 begins processing the digital signal 230 a predetermined delay time $t_d$ after receiving the TRIG signal to thereby decode the scanned OMR symbol 210, as will be explained in more detail below. A clock generator 219 applies a system clock signal CLK to clock a counter 221 and other circuitry in the processing and control circuit 218. In response to the CLK signal, the counter 221 generates a count 223 that, the circuit 218 uses in decoding scanned OMR labels, as will also be described in more detail below. The processing and control circuit 218 also provides and receives signals over a communications link 232 coupled to an external component (not shown) such as an external computer. Once the processing and control circuit 218 has decoded an OMR symbol, the control circuit provides binary data corresponding to the data in the decoded OMR symbol over the communications link 232 to the external computer. The communications link 232 is also utilized by the external computer to provide the circuit 218 with certain information necessary to decode the OMR symbols 208, 210 such as the number of cells in the OMR symbols.

Figure 3:
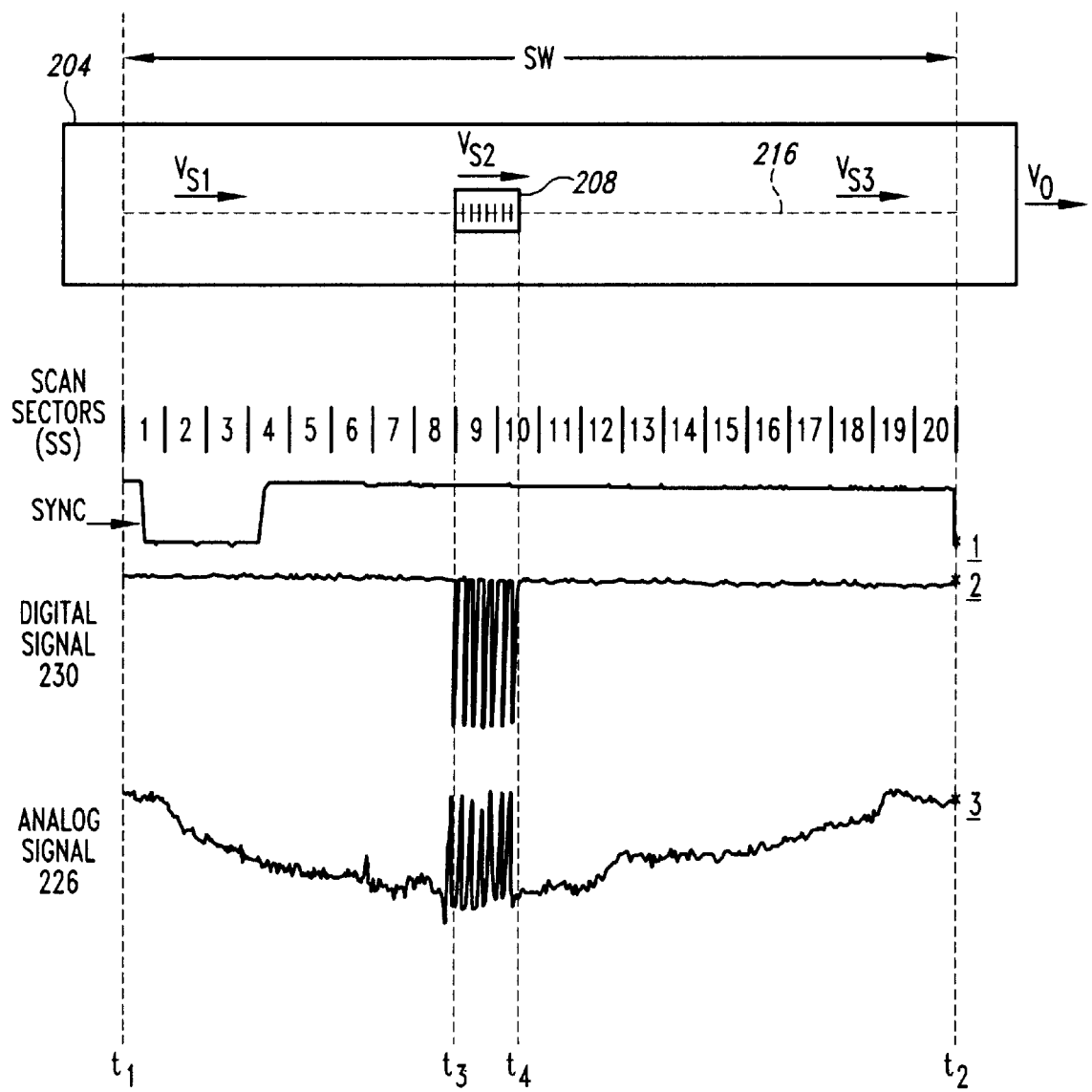
FIG. 3 is a signal diagram illustrating various signals during operation of the OMR laser scanner of FIG. 2 when a scanned OMR symbol is positioned near the center of a scan window.

In operation, the OMR system 200 operates in two modes, a calibration mode and a decoding mode. Before describing operation of the laser scanner 202 during calibration and decoding modes, a general description of the operation of the laser scanned in developing the digital signal 230 and "count" data for the digital signal will be provided with reference to the signal diagrams of FIGS. 3–5. This general description will enable a better understanding of the calibration and decoding modes of operation. Referring to FIG. 3, the OMR labeled object 204 is shown at the top with the OMR symbol 208 positioned near the center of the scan window SW. The path traveled by the scanning laser spot 216 is shown, with the spot velocity of the laser spot being indicated as $V_{S1}$, $V_{S2}$ and $V_{S3}$ near the left, center and right, respectively, of the scan window SW. As previously described, the spot velocity $V_{S2}$ is less than the spot velocities $V_{S1}$ and $V_{S3}$.

The scan window SW is divided into 20 scan. sectors as shown, each scan sector corresponding to a portion of the scan window. The laser scanner 202 utilizes the scan sectors in compensating for the variable spot velocity of the laser spot 216, as will be described in more detail below. A scan synchronization signal SYNC goes low at a time $t_1$, signaling the start of a scan of the laser spot 216 across the scan window SW. The SYNC signal thereafter goes high, and at a time $t_2$ once again goes low indicating the end of the scan of the laser spot 216 across the scan window SW. In FIG. 3, the analog signal 226 from the detector 222 is shown from the start of the scan at the time $t_1$ to the end of the scan at a time. Between a time $t_3$ and a time $t_4$, it is seen that there are seven inverted spikes or dips in the amplitude of the analog signal 226, each of the spikes corresponding one of the bars in the OMR label 208. Thus, when the laser beam 216 travels through scan sectors 8–10 in the scan window SW, the bars in the OMR label 208 absorb the light 216 from the laser device 214 and thus no reflected light 224 is received by the detector 222. In response to receiving substantially no reflected light 224, the photo detector 222 generates the analog signal 226 having the dips between the times $t_3$ and $t_4$. The digital signal 230 is merely the digitized version of analog signal 226.

Figure 4:
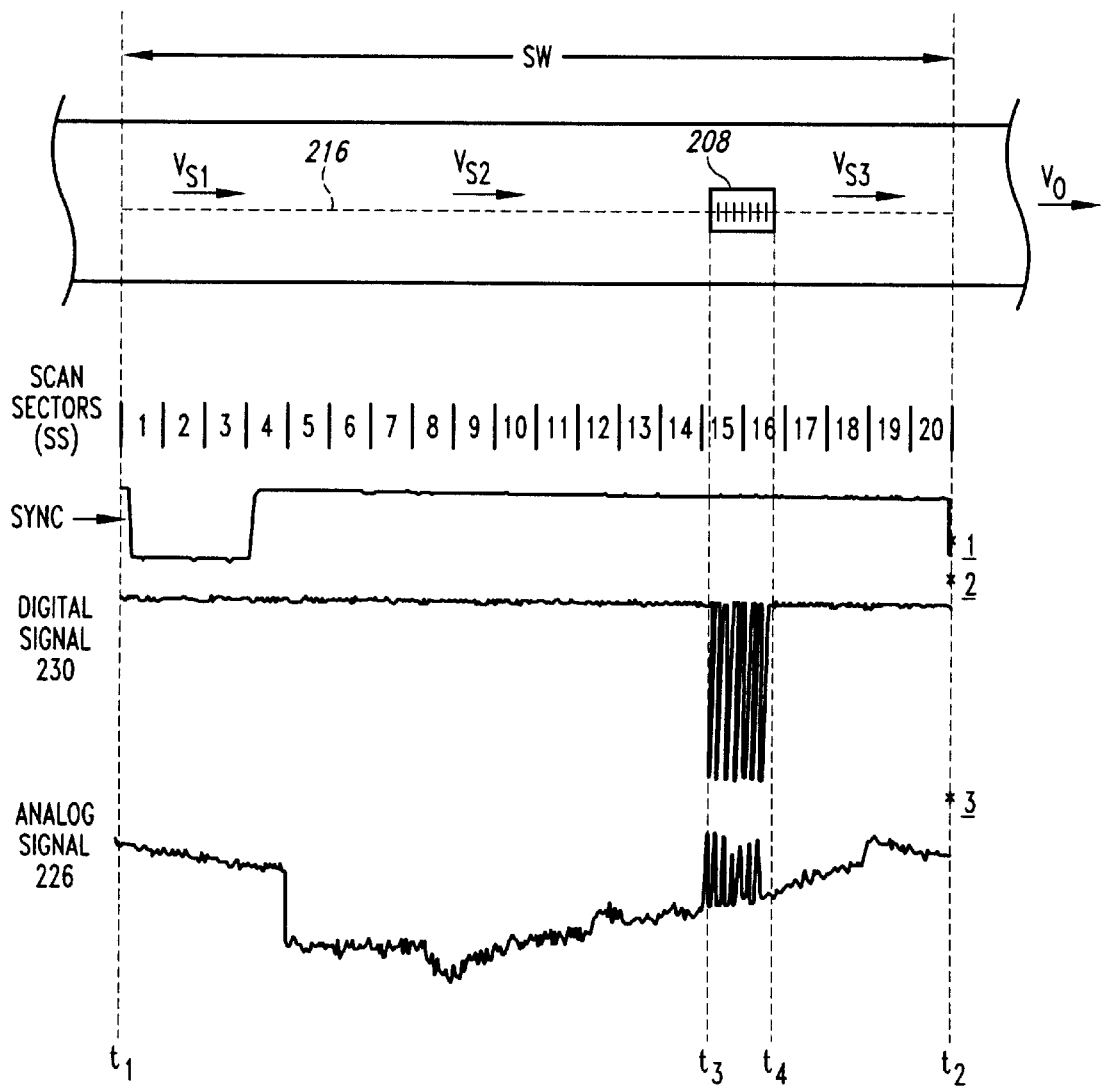
FIG. 4 is a signal diagram illustrating various signals during operation of the OMR laser scanner of FIG. 2 when a scanned OMR symbol is positioned near the right side of a scan window.

FIG. 4 is a signal timing diagram illustrating signals in the laser scanner 202 during a scanning operation when the OMR label 208 being scanned is shifted towards the right side of the scan window SW. In comparing FIGS. 3 and 4, it is seen that the OMR label 208 is shifted from scan sectors 8–10 in FIG. 3 to scan sectors 15–16 in FIG. 4 or towards the right side of the scan window SW. As a result, the spot velocity $V_S$ of the laser spot 216 is faster when it illuminates the OMR label 208 in scan sectors 15–16 in FIG. 4 than the spot velocity $V_S$ of the laser spot 216 when it illuminates the OMR label 208 in scan sectors 8–10 in FIG. 3. The faster spot velocity $V_S$ in FIG. 4 results in the corresponding dips in the analog signal being compressed in time. In other words, the duration from the time $t_3$ to $t_4$ is shorter in FIG. 4 than the corresponding duration in FIG. 3. Thus, the scanning of the same OMR label 208 in FIGS. 3 and 4 results in different analog signals 226 and corresponding digital signals 230 due to the varying spot velocity $V_S$ of laser spot 216 and the differing position of the OMR label 208 within the scan window SW.

Figure 5:
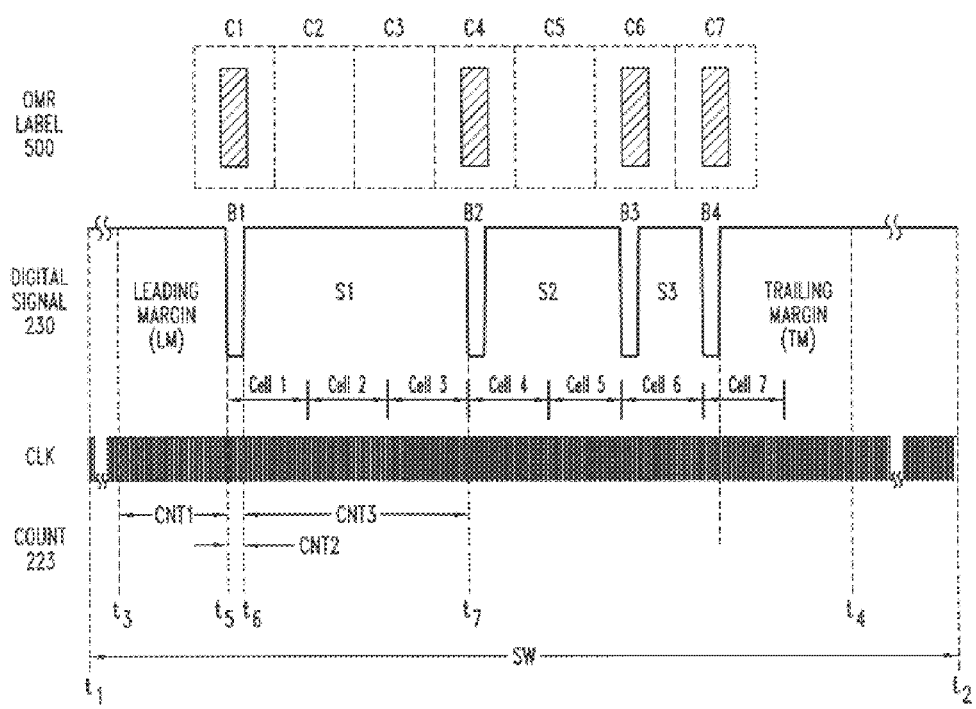
FIG. 5 is a sample signal diagram illustrating bar and space counts generated by the laser scanner of FIG. 2 when reading an OMR symbol.

FIG. 5 is a signal timing diagram illustrating the operation of laser scanner 202 in converting the digital signal 230 into margin, bar, and space count data that is utilized by the laser scanner in decoding the OMR label 208, as explained in more detail below. In FIG. 5, an OMR label 500 is scanned, the label having seven cells designated C1–C7, with the cells C1, C4, C6, and C7 containing bars and the cells C2, C3, and C5 containing spaces. The digital signal 230 shown in FIG. 5 corresponds to the portion of the digital signal 230 shown in FIGS. 3 and 4 between the times $t_3$ and $t_4$. In FIG. 5, however, the time axis of the digital signal 230 has been expanded between the times $t_3$ and $t_4$ to better illustrate how the digital signal 230 is converted into margin, bar, and space count information, as will now be described in more detail. FIG. 5 also shows the system clock signal CLK. As previously described with reference to FIG. 2, the CLK signal clocks the counter 221 and other circuitry in the processing and control circuit 218 during operation of the laser scanner 202. The count 223 generated by the counter 221 is latched by circuitry in the processing and control circuit 218 in response to each transition of the digital signal 230 to thereby store a leading margin count LM, trailing margin count TM, bar counts B1–B4, and space counts S1–S3 for the digital signal 230.

In operation, before the time $t_1$, the count from the counter 221 is reset to zero. When the scan begins at the time $t_1$, the counter 221 begins incrementing the count 223 in response to the CLK signal. Each cycle of the CLK signal typically increments the count 223 by one count. Since the period of the CLK signal is known, each latched count 223 corresponds to a time value equal to the count times the period of the CLK signal. In response to each transition of the signal 230, the value of the count 223 is latched. In this way, each latched count 223 corresponds to the duration of certain characteristics of the digital signal 230 and enables the processing and control circuit 218 to evaluate these characteristics and determine whether a valid OMR label has been scanned as well as the data contained within the OMR label, as will be understood by those skilled in the art.

In FIG. 5, a count CNT1 from the counter to 221 is latched at a time $t_5$ when the digital signal 230 goes low, and a count CNT2 is latched at a time $t_6$ when the digital signal 230 goes high. The count CNT1 is the leading margin count LM, and the count CNT2 corresponds to the bar count B1 for the first bar in the OMR label 500. The next count CNT3 latched by the control circuit 218 corresponds to a space count S1 resulting from their being no bars in cells C2 and C3 in the OMR label 500. Note that each falling-edge transition of the signal 230 indicates the start of a bar count and end of a space count, while each rising-edge transition of the signal 230 indicates the start of a space count and end of a bar count. The control circuit 218 proceeds in this manner, latching the count 223 in response to each transition of the digital signal 230 to thereby generate the bar counts B2, B3, and B4, and space counts S2 and S3, and the trailing margin count TM for the OMR label 500. These generated counts are thereafter utilized in decoding scanned OMR labels and in calibrating the scanner 202, as will described in more detail below.

Figure 6:
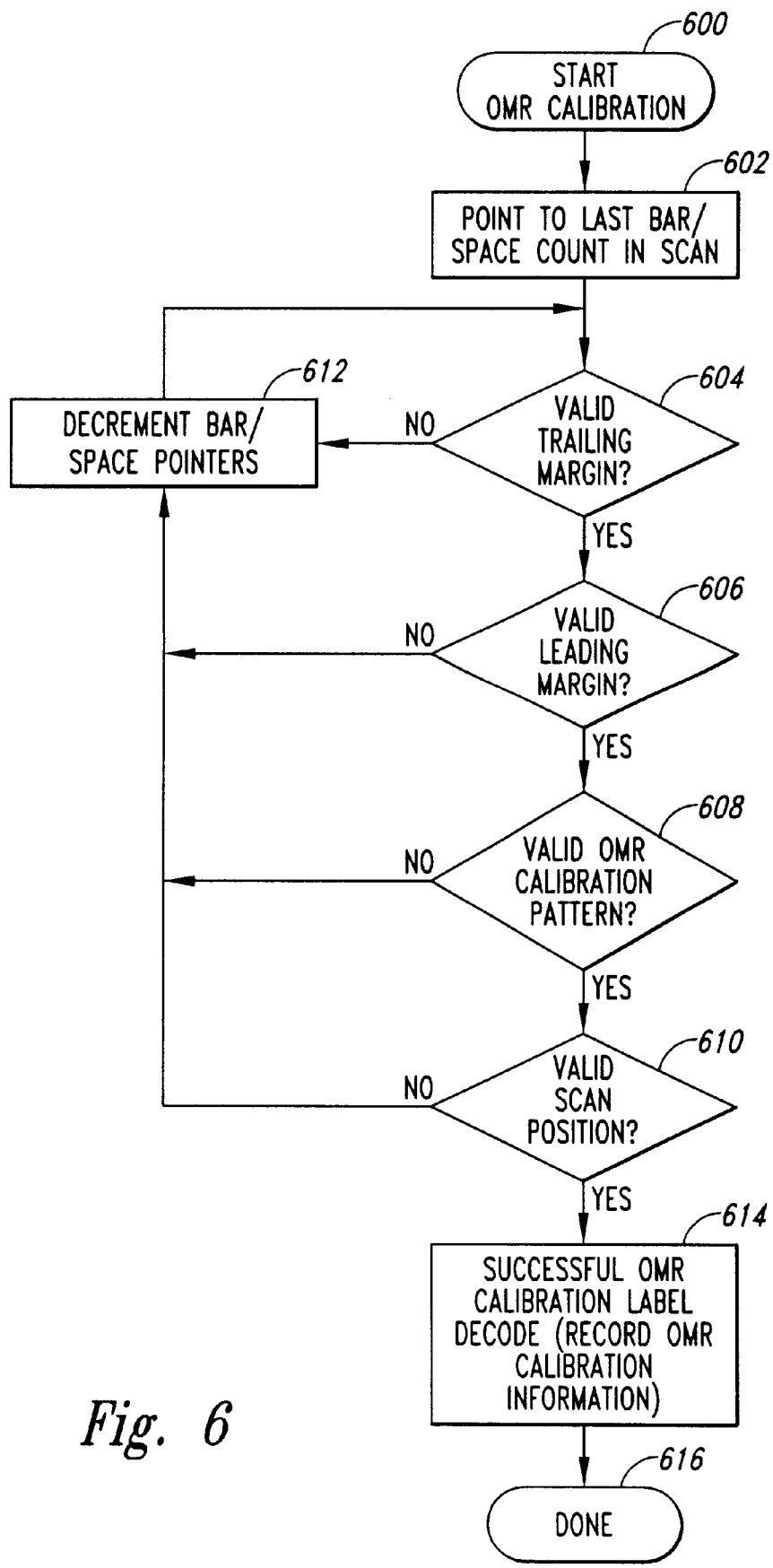
FIG. 6 is a flow chart illustrating operation of the laser scanner of FIG. 2 during a calibration mode of operation.
Figure 7:
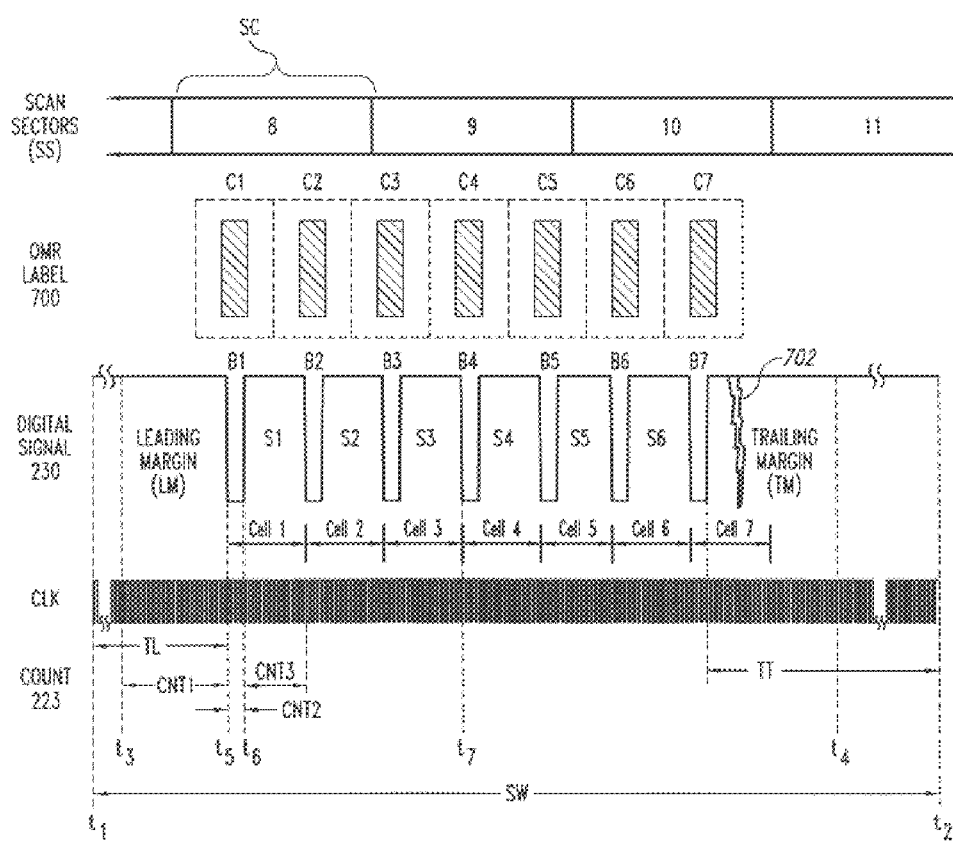
FIG. 7 is a signal diagram illustrating various signals in the laser scanner of FIG. 2 during the calibration mode of operation.

The operation of the laser scanner 202 during the calibration mode of operation will now be described in more detail with reference to the flow chart of FIG. 6 and signal diagram of FIG. 7. In the calibration mode, the laser scanner 202 determines a number of parameters necessary to accurately decode a particular group of OMR symbols 208, 210 to be scanned by the system 200. To place the laser scanner 202 in the calibration mode, the external computer applies a calibration signal over the communications link 232. The external computer also transfers a number-of-cells parameter to the laser scanner 202 over the communications link 232. The number-of-cells parameter indicates the number of cells contained in the OMR labels being calibrated, which is utilized by the laser scanner 202 during calibration. During calibration, a special OMR calibration symbol 700 having a bar in each cell of the symbol is utilized as shown in FIG. 7. The calibration symbol 700 is utilized so that the laser scanner 202 can calculate all required parameters during calibration, as will be appreciated by those skilled in the art.

The laser scanner 202 begins the calibration process in step 600, and proceeds immediately to step 602. In step 602, the scanner 202 generates a bar pointer BP that initially points to a last bar count in the scan and a space pointer SP that initially points to the last space count in the scan. In the label 700, the bar pointer BP initially points to the bar count B7 and the space pointer SP initially points to the trailing margin count TM. From step 602, the process proceeds to step 604 where it determines whether the scanned OMR label 700 contains a valid trailing margin TM. To determine whether the trailing margin TM is valid, the process determines the minimum bar value of the three bar counts adjacent to the possible trailing margin count TM. Thus, in the example of FIG. 7, the process determines the minimum value of the bar counts B5, B6 and B7, which is designated BCMIN. The process then determines whether the possible trailing margin count TM is greater than or equal to the minimum bar count BCMIN times a Margin Ratio Constant ("MRC"). This ensures that the trailing margin count TM must be greater than a minimum value to be considered a valid trailing margin count.

When step 604 determines the trailing margin count TM is a valid trailing margin, the process proceeds to step 606. In step 606, the process determines whether a valid leading margin count LM is present. At this point, the bar pointer BP points to the bar B7 and the space pointer SP points to the trailing margin count TM. Recall, the number of bars in the label 700 is given by the number-of-bars parameter applied to the scanner 202 prior to calibration. From this parameter, the process determines the expected first bar in the OMR label 700 merely by counting. the number-of-bars count from the bar pointer BP. Thus, in FIG. 7, the process moves 6 (7-1) bar counts from the bar count B7 to the bar count B1. Once the process determines the bar count B1 is the expected first bar in the OMR label 700, the process thereafter moves the space pointer SP to point to the possible leading margin count LM, which is the space count proceeding the bar count B1. At this point, the process proceeds in a manner analogous to that previously described the validation of the trailing margin TM in step 604 to verify a valid leading margin LM. Thus, the process determines the minimum bar count from the bar counts B1, B2, B3, and then multiplies this minimum bar count times the margin ratio constant MRC. If the leading margin count LM is greater than or equal to the minimum bar count times the constant MRC, then the count LM is a valid leading margin.

If step 606 determines the LM count is a valid leading margin, the process proceeds to step 608 and determines whether the measured bar and space counts correspond to a valid OMR label calibration pattern. In step 608, the process performs ratio tests on the bars, spaces, and cells in the detected OMR calibration label 700 to verify that a valid OMR calibration label has been detected. More specifically, the process ensures that the ratio of the maximum bar count to the minimum bar count for the bars B1–B7 is less than or equal to a predetermined bar ratio value. Similarly, the process ensures that the ratio of the maximum space count to the minimum space count for the spaces S1–S6 is less than or equal to a predetermined space ratio value, and also ensures that the ratio of the maximum cell count to the minimum cell count is less than or equal to a predetermined cell ratio value. The respective ratio tests ensure that the variances among the bar, space, and cell counts are within desired limits. Such limits are typically determined empirically during characterization of the laser scanner 202. The process also determines whether the detected number of bars in the OMR label 700 corresponds to the expected number of bars defined by the number-of-bars parameter. The expected number of bars may also be verified in step 606 when the expected LM count is located, as will be understood by those skilled in the art.

When step 608 determines a valid OMR calibration label has been detected, the process proceeds to step 610 and verifies that the scan position of the OMR label 700 is acceptable. The scan position of the OMR label 700 is the position of the OMR label within the scan window SW as determined be the scan sectors SS containing the label. In FIG. 7, the scan position of the label 700 extends from scan sectors 8–10. It is desirable that the scan position of the OMR label 700 be near the center of the scan window SW and not too close to either end of the scan window, as will be understood by those skilled in the art. In validating the scan position of the OMR label 700, the process initially determines a scan sector count SC for each scan sector SS in the scan window SW. The sector count SC equals the total scan count TSC divided by N, where N is the number of sectors in the scan window SW.

Once the sector count SC has been calculated, the process validates the scan position of the OMR label 700 in one of two ways depending on whether an auto framing function of the scanner 202 is activated. As will be understood by those skilled in the art, the auto framing function turns the laser beam 216 ON and OFF so that the laser beam is applied only during a portion of the scan window SW containing the OMR label 700 plus desired leading and trailing margins. When auto framing is deactivated, step 610 determines the scan position is valid when the total trailing count TT minus the total leading count TL is less than or equal to five scan sectors SC. The total trailing count TT equals the count from the last bar 37 to the end of the scan at the time $t_2$, including the trailing margin TM. The total leading count TL equals the count from the start of the scan at time $t_1$ to the gate bar B1, including the leading margin LM. This test ensures that the scan position of the OMR label 700 is not too close to the leading or trailing edge of the scan window SW.

When auto framing is activated, step 610 adjusts to the turn ON and turn OFF times of the laser beam 216 to position the scanned OMR label 700 in approximately the center of the scan window SW. If the total leading count TL minus the total trailing count TT is less than or equal to one scan sector SC, the scan position is considered valid and no adjustment of the laser beam 216 is made. When TL count minus TT count is greater than one scan sector SC, the process first adjusts the laser OFF time with reference to the leading edge of the scan window SW. First, the process determines a desired laser margin time $t_M$ that is equal to the scan sector count SC times a laser margin constant times the period T of the system clock CLK (i.e., the duration of a single count). The total leading count TL is then converted to a time $t_{LM}$ by multiplying this count times the period T. The difference between the laser margin time $t_M$ and the time $t_{LM}$ equals the laser off time $t_{OFF}$ required to achieve the desired laser margin.

After the laser off time $t_{OFF}$ has been determined, the process calculates the desired on time $t_{ON}$ of the laser beam 216. To calculate the time $t_{ON}$, the process first subtracts the total leading count TL and the total trailing count TT from the total scan count TSC (TSC–TL–TT) to define count OMRCOUNT. The OMRCOUNT count corresponds to the summation of the counts for all of the cells C1–C7 in the OMR label 700. The OMRCOUNT is then multiplied by the period T to convert the count to a time, and this time is added to twice the laser off time $t_{OFF}$ to generate be laser on time $t_{ON}$.

If the determination in any of the steps 604–610 is negative, the process goes to step 612 and decrements the bar pointer BP and space pointer SP to point to the next bar and space, respectively, in the signal 230 and then proceeds back to step 604 and once again attempts to validate the trailing margin count TM. By decrementing the bar and space pointers BP and SP, the process shifts the portion of the total scan count TSC being evaluated to detect a valid OMR calibration label 700. For example, in FIG. 7 the bar pointer BP may initially point to a noise bar 702. In this situation, the presence and location of this noise bar 700 may lead to one or more of steps 604–610 being unsuccessful. When any of steps 604–610 is unsuccessful, the process proceeds to step 612, decrements the bar and space pointers BP and SP, and once again attempts to recognize a valid OMR calibration label 700.

Once steps 604–610 have been successfully executed, the OMR label 700 has been successfully decoded and the process proceeds to step 614 and stores the calibration parameters calculated in steps 604–610. These calibration parameters include the laser ON time $t_{ON}$, laser OFF time $t_{OFF}$, cell counts for the cells C1–C7, the leading margin count LM, sector count SC, trigger delay $t_d$, and average bar width. In addition, a cell clock value CCLK for each cell C1–C7 that equals the count for the cell divided a constant is also calculated, as will be described in more detail below. The process also stores the delay time $t_d$ of the successfully decoded OMR calibration label 700, which corresponds to the time-stamp of the successfully decoded calibration label. Recall, during the calibration mode, each scan is time-stamped with the time-stamp corresponding to the delay time $t_d$ after receiving the TRIG signal. The scanner 202, thereafter uses the delay time $t_d$ during the decoding mode of operation to determine which digital signals 230 should be evaluated to decode a scanned OMR label, as will be discussed in more detail below. Once the calibration parameters have been stored, the process proceeds to step 616 and the calibration mode of operation is terminated.

Once the calibration mode has terminated, the laser scanner 202 begins operation in the decoding mode. As previously described, the variable spot velocity of the laser beam 216 presents difficulties in successfully decoding OMR labels. In the laser scanner 202, a normalization table provides values to compensate for the variable spot velocity of the laser beam 216 and provide accurate decoding of scanned OMR labels. The normalization table is a table of sector values and a corresponding normalization constant NC for each sector value. A sample normalization table is shown below in Table 1:

TABLE 1

Sample Clock Normalization Lookup Table

| Scan Sector (SS) | Clock Normalization Constant (NC) |
|---|---|
| Scan Sector SS1 | –20% difference |
| Scan Sector SS2 | –15% difference |
| Scan Sector SS3 | –10% difference |
| Scan Sector SS4 | –5% difference |
| Scan Sector SS5 | 0% difference |
| Scan Sector SS6 | 0% difference |
| Scan Sector SS7 | –5% difference |
| Scan Sector SS8 | –10% difference |
| Scan Sector SS9 | –15% difference |
| Scan Sector SS10 | –20% difference |

The Table 1 normalization table includes ten scan sectors SS1–SS10, and a corresponding normalization constant NC for each scan sector. The respective normalization constants NC are utilized to adjust the cell clock CCLK value for a corresponding cell, each normalization constant NC being a numeric value that represents a percent difference for each sector relative to the center of the scan. The normalization table of Table 1 must be developed for the particular type of laser scanner 202 being utilized in the system 200. Typically, the normalization table is developed empirically through testing and evaluation of the particular laser scanner 202 being used. Such a normalization table may also be developed through theoretical. characterization of the laser scanner, or a combination of theoretical and empirical evaluations, as will be understood by those skilled in the art.

To commence the decoding process, the laser scanner 202 executes an initialization routine that develops a table of normalization constants for the sectors SS in the scanned OMR calibration label 700. including the leading margin LM, trailing margin TM, and cells C. To generate this table, the initialization routine defines a variable CSUM and sets this variable equal to the leading margin count LMC from the calibration process and defines a variable SSUM that is set equal to the sector count SC. A variable SECTOR is also defined and initially set equal to zero. In operation, the initialization routine adds SSUM to itself and increments SECTOR until SSUM is greater than or equal to CSUM. Once SSUM is greater than or equal to CSUM, the value of SECTOR at this time, which corresponds to the number of sector counts SC in the LM count, is used as a starting index pointer to the first normalization constant in the normalization table of Table 1 and the corresponding normalization constant is stored for this sector. The routine then sets CSUM equal to LM plus the cell clock CCLK of the first cell adjoining the leading margin times the number of clocks per cell, which is five in our example(CSUM=LM+CCLK*5). The routine thereafter once again adds SSUM to itself and increments SECTOR until SSUM is greater than or equal to CSUM. Once SSUM is greater than or equal to CSUM, the value of SECTOR and the corresponding normalization constant in the normalization table is stored for this sector.

This process is repeated until all cells and margins in the OMR calibration label 700 have been assigned a normalization constant in Table 1.

At this point, the scanner 202 is ready to decode scanned OMR labels. Once an OMR label has been scanned the laser scanner 202 executes the process illustrated in the flow chart of FIG. 8 in decoding the scanned OMR label. The process starts in step 800 and proceeds immediately to step 802. In step 802, the process executes a validation routine that validates the bars and margins detected in the scanned OMR label. The validation routine utilizes a number of variables, as defined in Table 2 below:

TABLE 2

Figure 8:
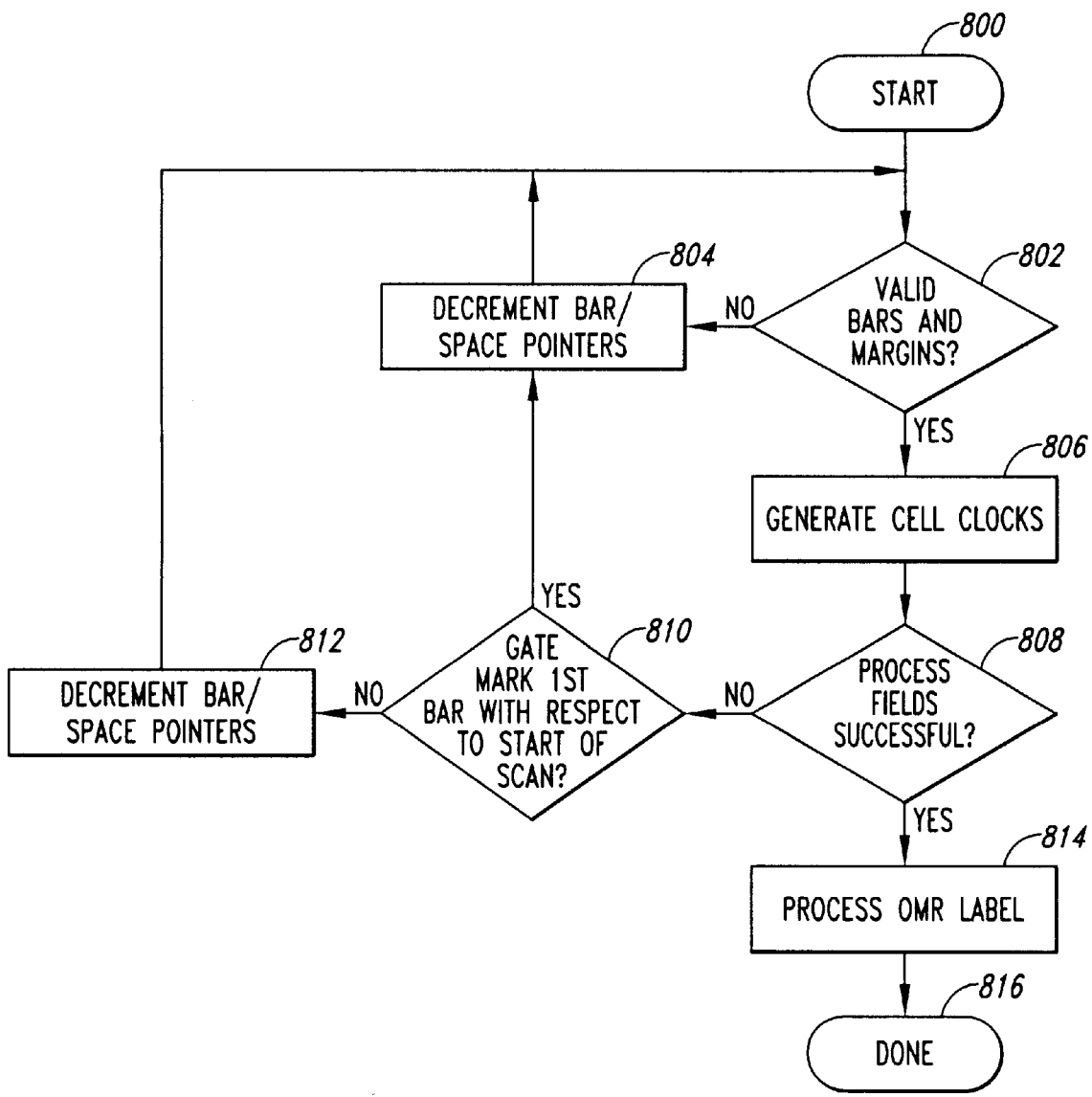
FIG. 8 is a flow chart illustrating operation of the laser scanner of FIG. 2 during a read mode of operation.

Validation Routine Parameters (see step 802 of FIG. 8)

| | |
|---|---|
| TSUM | (Average Field Size * (number of fields − 1)) + 5% |
| RSUM | Running sum of bar-space count pairs. |
| SCAN SECTORS | Total possible count value (TSC) for one scan divided by a constant (N) |
| CLK | Average Field Size/number of scan sectors |
| MRGRATIO | 10 * MINBAR (5 * MINBAR if narrow margins enabled) |
| AVGBAR | Determined during calibration mode |
| MINBAR. | Minimum bar count for possible OMR symbology |
| MAXBAR | Maximum bar count for possible OMR symbology |
| BARCOUNT | Number of valid bars detected in OMR Label in an |

Figure 9:
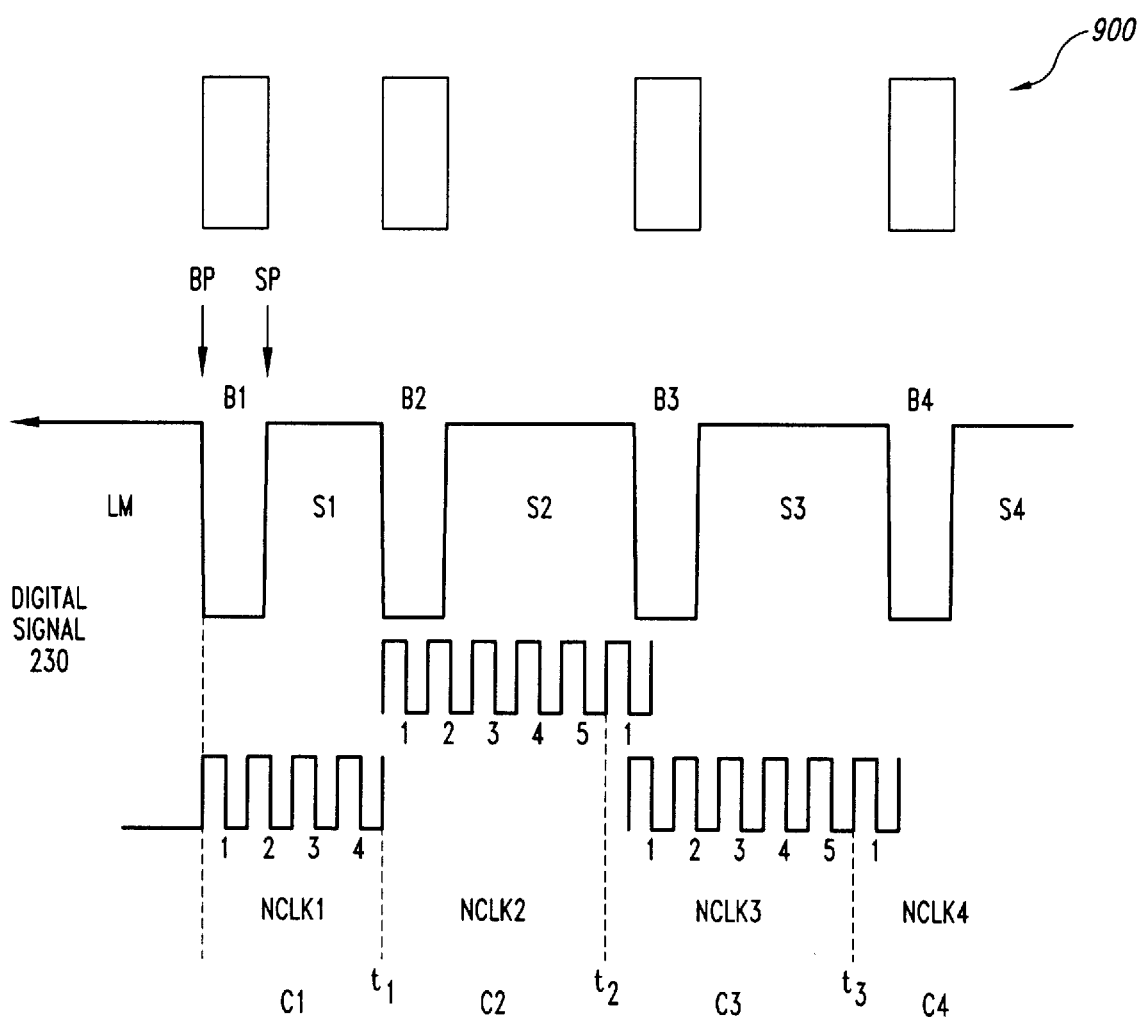
FIG. 9 is a signal diagram illustrating normalized cell clocks utilized by the laser scanner of FIG. 2 in decoding respective cells in an ONR symbol during the read mode of operation.

The operation of the validation routine in validating bars and margins in the scanned OMR label will now be described in more detail with reference to the signal diagram of FIG. 9. Initially, the bar pointer BP points to the possible gate bar in a scanned OMR label 900, which is the bar B1 in FIG. 9. The space pointer SP initially points to the leading margin LM, and this count is saved as the leading margin of the OMR label and the space pointer SP is then incremented to point to the space S1. At this point, the variable BARCOUNT, which was initially set to zero, is incremented indicating one bar (i.e., the bar B1) has been detected in the scanned OMR label. The variable RSUM is initially set to zero.

The validation routine then tests the count of bar B1 to ensure this count is within an allowable range defined by MINBAR and MAXBAR (see Table 2). If bar B1 is within this allowable range, then the bar is a valid bar, and is otherwise an invalid bar. The bar count B1 and space count S1 are then summed to generate a bar-space count which is added to RSUM. If RSUM is less than TSUM, then the bar pointer BP is moved to point to the bar B2 and the space pointer SP is moved to point to the space S2. At this point, the routine increments BARCOUNT, indicating two bars have been detected, and then determines whether B2 is within the allowable range defined by MINBAR and MAX-BAR. The validation routine then increments the bar pointer BP and space pointer SP to point to the next bar and space, respectively, and proceeds as previously described to validate the bar.

The validation routine continues testing bars until RSUM is greater than or equal to TSUM. At this point, any detected bars in the OMR label are outside the expected count of an OMR label as defined by the variable TSUM, and thus the validation routine retained stops processing any further bars. At this point, the validation routine stores RSUM−TSUM as the trailing margin TM. If RSUM is greater than or equal to TSUM but TSUM−RSUM is less than or equal to CLK, then the corresponding bar is tested since it is close to the expected count of the OMR label given by TSUM. In this situation, the bar pointer BP and space pointer SP are moved to point to the next bar and space, respectively, and this bar is tested and the space pointed to by the space pointer SP is saved as the trailing margin TM.

At this point, the validation routine determines whether the detected trailing margin TM is valid. The trailing margin TM is valid when greater than or equal to MINBAR*MRGRATIO (see Table 2). The routine next tests the validity of the detected leading margin LM by determining whether the leading margin LM is greater than or equal to MINBAR*MRGRATIO. Finally, the validation routine determines whether MINBAR and MAXBAR are valid by evaluating the respective variance of each from AVGBAR.

Referring back to FIG. 8, if step 802 determines any of the detected bars or margins in the scanned OMR label are invalid, the process proceeds to step 804 where the bar pointer BP and space pointer SP are incremented to point to the next bar and space, respectively. The process then returns to step 802 and once again attempts to validate the detected bars and margins. Once all detected bars and margins in the scanned OMR label are determined to be valid in step 802, the process proceeds to step 806.

In step 806, the process uses the normalization table of Table 1 to generate a normalized cell clock NCLK for each cell in the OMR label being decoded. As previously described, each cell has a corresponding cell clock CCLK determined during the calibration mode by dividing the determined count of the cell by five. Each of these calculated cell clocks CCLK is then normalized using a corresponding normalization constant NC from Table 1 and the normalization constant for the corresponding cell in the OMR calibration label 700 as determined during the initialization routine. More specifically, a normalization constant for each cell in the scanned OMR label being decoded is determined in the same way as the initialization routine determines normalization constants for the cells in the OMR calibration label 700 as previously described. Thus, for each cell in the OMR label being decoded, a corresponding normalization constant is determined. The difference between the normalization constant for a given cell in the OMR calibration label 700 and the normalization constant for that cell in the OMR label being decoded is then utilized to normalize the cell clock for that cell and thereby generate the normalized cell clock NCLK for the cell. The OMR label is then decoded is using the normalized cell clocks NCLK to clock through the OMR cells and process the data (i.e., detected bars and spaces), as will now be explained in more detail. If the scan position of the OMR calibration label is within one scan sector SC of the OMR label being decoded, no normalization of the cell clocks CCLK determined during calibration is made. In this situation, each normalized cell clock NCLK is the same as the calibration cell clock CCLK.

Several tables of normalized cell clocks NCLK are set forth below to illustrate the normalized cell clocks NCLK generated in step 806 of the process of FIG. 8. In Table 3, the calibration process calibrated the OMR calibration label in the center of the scan window SW and the scanned OMR label to be decoded is also positioned in the center of the scan window. Table 3 is set forth below:

TABLE 3

Calibrated Center of Scan and Decoded Center of Scan

| Bar Count | Space Count | Total Cell Count | Calibrated Clock Value (CCLK) | Normalized Clock Value (NCLK) |
|---|---|---|---|---|
| B1 = 91 | S1 = 283 | Cell 1 = 374 | C_Clk1 = 75 | N_Clk1 = 75 |
| B2 = 93 | S2 = 285 | Cell 2 = 378 | C_Clk2 = 76 | N_Clk2 = 76 |
| B3 = 98 | S3 = 286 | Cell 3 = 384 | C_Clk3 = 76 | N_Clk3 = 76 |
| B4 = 92 | S4 = 287 | Cell 4 = 379 | C_Clk4 = 75 | N_Clk4 = 75 |
| B5 = 94 | S5 = 289 | Cell 5 = 383 | C_Clk5 = 75 | N_Clk5 = 75 |
| B6 = 85 | S6 = 291 | Cell 6 = 376 | C_Clk6 = 77 | N_Clk6 = 77 |

In Table 3, the calibrated clock value CCLK for each cell C equals the normalized clock value since the scanned OMR label being decoded is in the same position in the scan window SW as the scanned OMR calibration label.

In Table 4, the calibration process calibrated the OMR calibration label in the center of the scan window SW and the scanned OMR label to be decoded is positioned towards the right edge of the scan window. Table 4 is set forth below:

TABLE 4

Calibrated Center of Scan and Decoded Right Edge of Scan

| Bar Count | Space Count | Total Cell Count | Calibrated Clock Value | Normalized Clock Value |
|---|---|---|---|---|
| B1 = 85 | S1 = 257 | Cell 1 = 342 | C_Clk1 = 75 | N_Clk1 = 70 |
| B2 = 77 | S2 = 252 | Cell 2 = 329 | C_Clk2 = 76 | N_Clk2 = 71 |
| B3 = 85 | S3 = 254 | Cell 3 = 339 | C_Clk3 = 76 | N_Clk3 = 71 |
| B4 = 80 | S4 = 248 | Cell 4 = 328 | C_Clk4 = 75 | N_Clk4 = 67 |
| B5 = 76 | S5 = 241 | Cell 5 = 317 | C_Clk5 = 75 | N_Clk5 = 67 |
| B6 = 80 | S6 = 246 | Cell 6 = 326 | C_Clk6 = 77 | N_Clk6 = 69 |

In Table 4, the calibrated clock CCLK for each cell C is greater than the normalized clock value NCLK. This is true because the spot velocity of the laser beam 216 is faster for the OMR label being decoded at the right edge of the scan window SW than for the calibration label decoded in the center of the scan window. The faster spot velocity results in each cell effectively having a smaller count and thus a smaller normalized cell clock NCLK should be used in decoding these cells.

In Table 5, the calibration process calibrated the OMR calibration label at one edge of the scan window SW and the scanned OMR label to be decoded is positioned towards the center of the scan window. Table 5 is set forth below:

TABLE 5

Calibrated Right Edge of Scan and Decoded Center of Scan

| Bar Count | Space Count | Total Cell Count | Calibrated Clock Value | Normalized Clock Value |
|---|---|---|---|---|
| B1 = 70 | S1 = 288 | Cell 1 = 358 | C_Clk1 = 64 | N_Clk1 = 69 |
| B2 = 91 | S2 = 289 | Cell 2 = 380 | C_Clk2 = 64 | N_Clk2 = 69 |
| B3 = 89 | S3 = 291 | Cell 3 = 380 | C_Clk3 = 66 | N_Clk3 = 71 |
| B4 = 97 | S4 = 287 | Cell 4 = 384 | C_Clk4 = 65 | N_Clk4 = 68 |
| B5 = 92 | S5 = 287 | Cell 5 = 379 | C_Clk5 = 68 | N_Clk5 = 71 |
| B6 = 92 | S6 = 291 | Cell 6 = 383 | C_Clk6 = 66 | N_Clk6 = 71 |

In Table 5, the normalized clock value NCLK is greater than the calibrated clock CCLK for each cell. This is true because the spot velocity of the laser beam 216 is slower for the OMR label being decoded near the center of the scan window SW than for the calibration label decoded near the edge of the scan window. The slower spot velocity results in each cell effectively having a larger count and thus a larger normalized cell clock NCLK should be used in decoding these cells.

Once the normalized cell clocks NCLK for each cell have been determined in step 806, the process proceeds to step 808 and the OMR label is decoded using the normalized cell clocks NCLK. In step 808, a clocking algorithm is utilized to determine the presence or absence of a mark in each cell of the scanned OMR label. The clocking algorithm will now be explained with reference to FIG. 9, which illustrates portions of an OMR label 900 having a mark in each of four consecutive cells C1–C4 and the corresponding digital signal 230. The clocking algorithm utilizes normalized cell clocks NCLK1–NCLK4 to detect the presence of a mark or a space in the cells C1–C4, respectively. A clock sum variable CLKSUM is utilized in the clocking algorithm during the decoding process, where CLKSUM=CLKSUM+NCLKx. In this formula, NCLKx corresponds to the count for one period of the normalized cell clock currently being clocked. Another variable used in the clocking algorithm is a bar-space count BS that equals the sum of the bar count Bx and space count Sx for a given cell. For example, the BS count initially equals B1+S1.

The operation of the clocking algorithm in decoding cells C2–C4 will now be described. Initially, the clocking algorithm sets CLKSUM to zero, sets the BS count to B1+S1, and selects the normalized cell clock NCLK1. The algorithm thereafter adds NCLK1 (i.e., the count for one period of the NCLK1 clock) to the CLKSUM count and determines whether the CLKSUM count is greater than the BS count. The algorithm continues adding NCLK1 to the CLKSUM count until either five cycles of the NCLK1 have been added or the CLKSUM count is greater than the BS count. Once either of these conditions is satisfied, the algorithm selects the next normalized cell clock NCLK2. The algorithm then determines a valid bar B2 is present in cell CELL2 if the bar is detected within 1–2 clock cycles of NCLK2 from the cell clock switch at a time $t_1$. In the example of FIG. 9, after four cycles of the NCLK1 clock, the CLKSUM count exceeds the BS count and the selected cell clock switches to NCLK2 at time $t_1$. The bar B2 is detected within 1–2 cycles of the NCLK2 clock from the cell clock switch at time $t_1$, so cell C2 is determined to contain a valid bar.

The algorithm then resets the CLKSUM count to zero and changes the BS count to B2+S2. The algorithm adds NCLK2 to CLKSUM and determines whether the CLKSUM count is greater than the BS count. In this case, the CLKSUM count does not exceed the BS count after five cycles of the NCLK2 clock and the algorithm selects the NCLK3 clock at a time $t_2$. The algorithm the determines the cell C3 contains a valid bar B3 since the bar is detected within 1–2 clock cycles of the NCLK3 clock from the cell clock switch at the time $t_2$. The algorithm thereafter resets the CLKSUM count and proceeds in the same way in detecting the bar B4 in cell C4.

Figure 10:
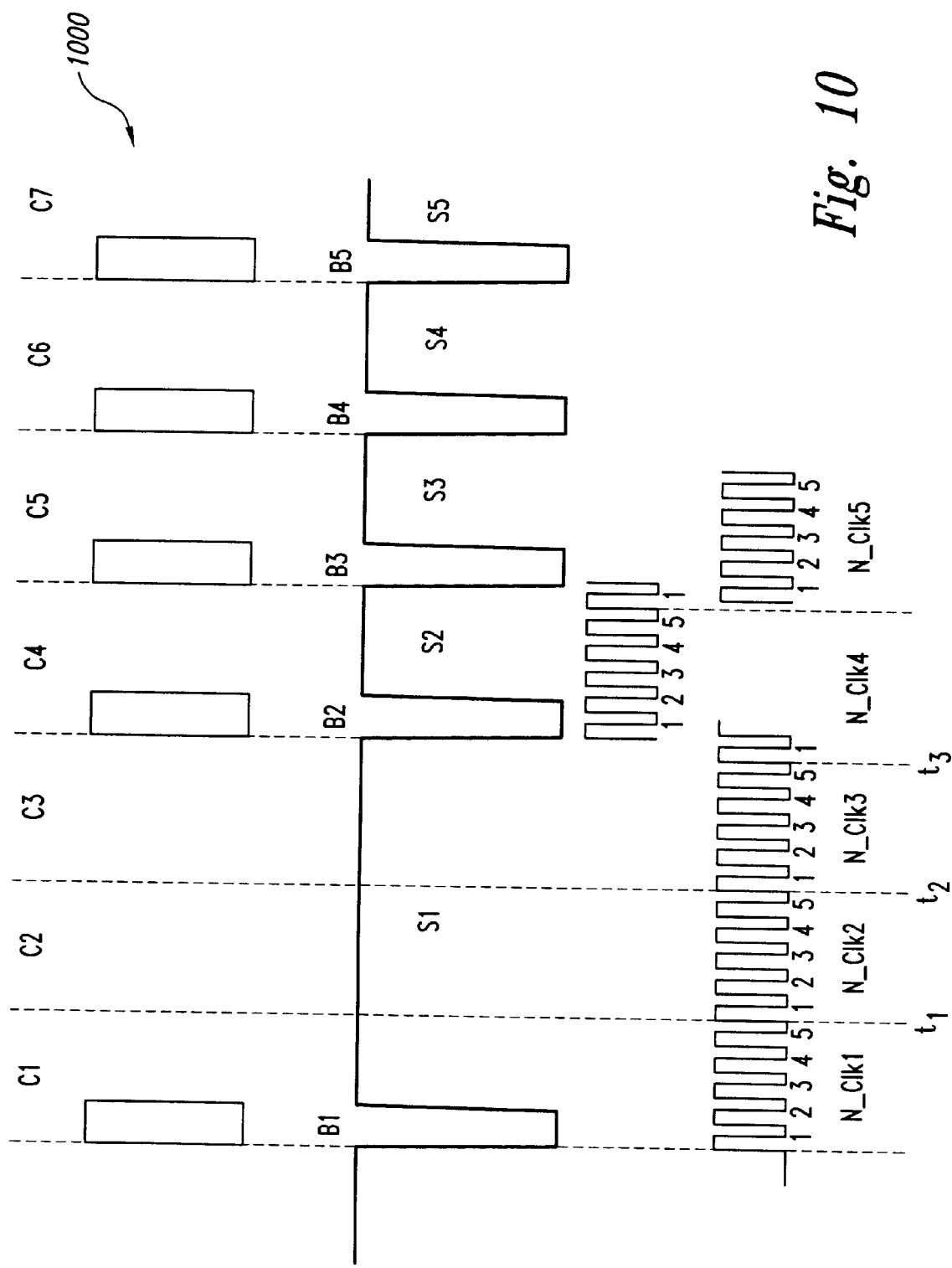
FIG. 10 is a signal timing diagram illustrating normalized cell clocks utilized by the laser scanner of FIG. 2 in decoding respective cells in an OMR symbol during the read mode of operation when the OMR symbol includes spaces in several of the OMR cells.

FIG. 10 is a signal diagram illustrating a portion of an OMR label 1000 having cells C1–C7 when some of the cells, C2 and C3, do not contain a mark. In the example of FIG. 10, cells C2 and C3 contain spaces (i.e., no marks) while the rest of the cells C1, C4–C7 contain bars. In decoding the label 1000, the clocking initially algorithm operates as previously described and sets CLKSUM to zero, sets the BS count to B1+S1, and selects the normalized cell clock NCLK1. The algorithm thereafter adds NCLK1 (i.e., the count for one period of the NCLK1 clock) to the CLKSUM count and determines whether the CLKSUM count is greater than the BS count. After five cycles of the NCLK1 clock, the CLKSUM count has not exceeded the BS count.

The algorithm then selects the NCLK2 clock at a time $t_1$ and determines a space is present in cell C2 because no bar is detected within 1–2 cycles of the NCLK2 clock from the cell clock switch at time$t_1$. The algorithm thereafter adds the NCLK2 clock to the CLKSUM count, checks to see if CLKSUM is greater than the BS count, and determines after five cycles of the NCLK2 clock that the CLKSUM count has not exceeded the BS count. The algorithm selects the NCLK3 clock at a time $t_2$ and determines a space is present in cell C3 because no bar is detected within 1–2 cycles of the NCLK3 clock from the cell-clock switch at time $t_2$. As before, the NCLK3 clock is added to the CLKSUM count, and the process checks to see if CLKSUM is greater than the BS count. After five cycles of the NCLK3 clock, the process determines that the CLKSUM count has not exceeded the BS count. The NCLK4 clock is then selected at a time $t_3$ and the process determines the cell C4 contains a bar since the bar is detected within 1–2 cycles of the NCLK4 clock from the cell clock switch at time $t_3$. The cells C5–C7 are thereafter decoded in the same way as previously described for the cells C2–C4.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. A symbol scanning device for reading information symbols, each symbol including a number of cells with each cell containing a bar or a space, the scanning symbol device comprising:
   an optical transmitter operable to generate a scanning beam that scans each symbol when the symbol is within a scan window;
   an optical detector positioned to receive optical energy reflected from each symbol responsive to the scanning beam, the optical detector generating a detection signal responsive to the received optical energy; and
   a processing circuit coupled to the optical transmitter and the optical receiver, the processing circuit operable to process the detection signal for a corresponding information signal within the scan window, wherein the processing circuit decodes the information symbol by determining the presence or absence of a bar in each cell.

2. The symbol scanning device of claim 1 wherein the scanning beam comprises a scanning laser beam.

3. The symbol scanning device of claim 1 wherein the symbols comprise optical mark recognition (OMR) symbols.

4. The symbol scanning device of claim 1 wherein the processing circuit operates during a calibration mode to sample the detection signal and time stamp each sample, the time stamp corresponding to the time between a trigger time and the time the detection signal was sampled, the processing circuit evaluating the sampled detection signals and determining a delay time given by the difference between the trigger time and the time stamp of the detection signal for a successfully captured calibration symbol, and the processing circuit thereafter operable during a decoding mode to start processing samples of the detection signal the delay time after the trigger time.

5. The symbol scanning device of claim 1 wherein each symbol is moving relative to the optical transmitter.

6. The symbol scanning device of claim 5 wherein each symbol moves at a variable velocity relative to the optical transmitter.

7. The symbol scanning device of claim 1 wherein the optical detector comprises a photo diode.

8. The symbol scanning device of claim 1 wherein the processing circuit operates in a calibration mode to scan an optical mark recognition (OMR) calibration symbol, determine the position of the calibration symbol within the scan window, and determine a plurality of decoding parameters, each decoding parameter being associated with a particular cell in the OMR calibration symbol, and the processing circuit further operable in a decoding mode to determine the position of a scanned OMR symbol in the scan window relative to the position of the calibration label and adjusting the decoding parameters as a function of the relative position of the scanned OMR symbol, the processing circuit thereafter applying each adjusted decoding parameter to the corresponding cell in the scanned OMR symbol to decode the scanned OMR symbol.

9. The symbol scanning device of claim 8 wherein the processing circuit includes a stored normalization look-up table including a plurality of records, each record including a scan sector field storing a corresponding scan sector and a normalization constant field storing a corresponding normalization constant, the processing circuit operable to assign each cell in the OMR calibration symbol a first normalization constant from the look-up table and operable to assign each cell in the scanned OMR a second normalization constant from the look-up table, and the processing circuit thereafter adjusting each decoding parameter for a respective cell as a function of the difference between the first and second normalization constants for the cell.

10. The symbol scanning device of claim 8 wherein each decoding parameter comprises a cell clock determined by dividing a cell count for the cell in the calibration symbol by a constant.

11. A laser scanner for reading optical mark recognition (OMR) symbols, each OMR symbol including a predetermined number of cells with each cell containing a bar or a space, the laser scanner comprising:
    an optical transmitter operable to generate a scanning laser beam that scans each OMR symbol with a laser spot when the symbol is within a scan window;
    an optical detector positioned to receive optical energy reflected from each OMR symbol responsive to the scanning laser beam, the optical detector generating a detection signal responsive to the received optical energy; and
    a processing circuit coupled to the optical transmitter and the optical receiver and adapted to receive a trigger signal, the processing circuit operable during a calibration mode to evaluate the detection signal to decode an OMR calibration symbol, the processing circuit developing a plurality of decoding parameters including a delay time given by the time between the trigger signal going active and the time the detection signal indicates the OMR calibration label was successfully decoded, and the processing circuit operable during a decoding mode the delay time after the trigger signal goes active to apply the decoding parameters to evaluate the detection signal and decode scanned OMR symbols.

12. The laser scanner of claim 11 wherein the laser spot has a variable spot velocity across the scan window and the processing circuit operates to adjust each decoding parameter to compensate for the variable spot velocity of the laser spot prior to the decoding mode of operation.

13. The laser scanner of claim 12 wherein the processing circuit adjusts each decoding as a function of the position of the scanned OMR symbol in the scan window relative to the position of the successfully decoded OMR calibration symbol in scan window.

14. The laser scanner of claim 11 wherein each symbol is moving relative to the optical transmitter.

15. The laser scanner of claim 14 wherein each symbol moves at a variable velocity relative to the optical transmitter.

16. The laser scanner of claim 11 wherein the optical detector comprises a photo diode.

17. A scanning system for reading optical mark recognition (OMR) symbols, each OMR symbol including a number of cells with each cell containing a bar or a space, the system comprising:

an object detector operable to detect the presence of an object and generate a trigger signal indicating whether an object is present;

an optical transmitter operable to generate a scanning laser beam that scans each OMR symbol with a laser spot when the symbol is within a scan window;

an optical detector positioned to receive optical energy reflected from each OMR symbol responsive to the scanning laser beam, the optical detector generating a detection signal responsive to the received optical energy; and a processing circuit coupled to the optical transmitter, optical receiver, and the object detector, the processing circuit operable during a calibration mode to evaluate the detection signal to decode an OMR calibration symbol, the processing circuit developing a plurality of decoding parameters including a delay time given by the time between the trigger signal going active and the time the detection signal indicates the OMR calibration label was successfully decoded, and the processing circuit operable during a decoding mode the delay time after the trigger signal goes active to apply the decoding parameters to evaluate the detection signal and decode scanned OMR symbols.

18. The system of claim 17 wherein the laser spot has a variable spot velocity across the scan window and the processing circuit operates to adjust each decoding parameter to compensate for the variable spot velocity of the laser spot prior to the decoding mode of operation.

19. The system of claim 18 wherein the processing circuit adjusts each decoding as a function of the position of the scanned OMR symbol in the scan window relative to the position of the successfully decoded OMR calibration symbol in scan window.

20. The system of claim 17 wherein each symbol is moving relative to the optical transmitter.

21. The system of claim 20 wherein each symbol moves at a variable velocity relative to the optical transmitter.

22. The system of claim 17 wherein the optical detector comprises a photo diode.

23. The system of claim 17 wherein the processing circuit forms for each scanned symbol a binary word containing the decoded data from the symbol.

24. A method of reading information symbols, each symbol including a number of cells with each cell containing one of a bar and a space, the method comprising:

scanning an information symbol with a moving beam when the symbol is within a scan window, the moving beam illuminating the symbol with applied optical energy and having a variable velocity;

detecting optical energy that is reflected from the information symbol responsive to the applied optical energy; and analyzing the detected optical energy to determine the presence or absence of a bar in each cell and thereby decode the scanned symbol.

25. The method of claim 24 wherein each information symbol comprises an optical mark recognition symbol.

26. A method of reading optical mark recognition (OMR) symbols, each symbol including a predetermined number of cells with each cell containing one of a bar and a space, the method comprising:

scanning an OMR calibration symbol with a moving laser beam, the laser beam illuminating the symbol with applied optical energy when the symbol is within a scan window;

detecting optical energy that is reflected from the OMR calibration symbol responsive to the applied optical energy;

analyzing the reflected optical energy to determine whether the optical energy corresponds to a successfully decoded OMR calibration symbol;

developing a plurality of decoding parameters for the scanned OMR calibration symbol once the reflected optical energy corresponds to a successfully decoded OMR calibration symbol;

determining the position of the successfully decoded OMR calibration symbol within the scan window;

scanning an OMR symbol with the moving laser beam when the OMR symbol is within the scan window, the laser beam illuminating the symbol with applied optical energy;

detecting optical energy that is reflected from the OMR symbol responsive to the applied optical energy;

determining the position of the scanned OMR symbol within the scan window;

adjusting the plurality of decoding parameters in response to the determined position of the scanned OMR symbol in the scan window relative to the position of the OMR calibration symbol; and applying the adjusted decoding parameters to decode the OMR symbol.

27. The method of claim 26 wherein determining the position of the OMR calibration symbol within the scan window comprises dividing a scan into a plurality of scan sectors, and thereafter determining which cells in the scanned OMR calibration symbol are contained in which sectors in the scan window, each cell in the calibration symbol then being assigned a first normalization constant from a look-up table of normalization constants for respective scan sectors, and wherein determining the position of the scanned OMR symbol being done in the same way with a second normalization constant from the look-up table being assigned to each cell in the scanned OMR symbol, and wherein adjusting the plurality of decoding parameters comprises adjusting a decoding parameter for each cell as a function of the difference between the first and second normalization constants for the cell.

28. The method of claim 26 wherein each scan of the OMR calibration symbol is time stamped relative to a trigger time, and a delay time corresponding to the time stamp of the successfully decoded OMR calibration symbol is stored, and thereafter scanning an OMR symbol with the moving laser beam occurs at approximately the delay time after the trigger time.

29. A symbol scanning device for reading information symbols, each symbol including a number of cells with each cell containing a bar or a space, the scanning symbol device comprising:

an optical transmitter operable to generate a scanning beam that scans each symbol when the symbol is within a scan window;

an optical detector positioned to receive optical energy reflected from each symbol responsive to the scanning beam, the optical detector generating a detection signal responsive to the received optical energy; and a processing circuit coupled to the optical transmitter and the optical receiver, the processing circuit operable to process the detection signal for a corresponding information signal within the scan window to thereby read the information symbol;

wherein the processing circuit operates during a calibration mode to sample the detection signal and time stamp each sample, the time stamp corresponding to the time between a trigger time and the time the detection signal was sampled, the processing circuit evaluating the sampled detection signals and determining a delay time given by the difference between the trigger time and the time stamp of the detection signal for a successfully captured calibration symbol, and the processing circuit thereafter operable during a decoding mode to start processing samples of the detection signal the delay time after the trigger time.

30. The symbol scanning device of claim 29 wherein the scanning beam comprises a scanning laser beam.

31. The symbol scanning device of claim 29 wherein the symbols comprise optical mark recognition (OMR) symbols.

32. The symbol scanning device of claim 29 wherein each symbol is moving relative to the optical transmitter.

33. The symbol scanning device of claim 32 wherein each symbol moves at a variable velocity relative to the optical transmitter.

34. The symbol scanning device of claim 29 wherein the optical detector comprises a photo diode.

35. A symbol scanning device for reading information symbols, each symbol including a number of cells with each cell containing a bar or a space, the scanning symbol device comprising:

an optical transmitter operable to generate a scanning beam that scans each symbol when the symbol is within a scan window;

an optical detector positioned to receive optical energy reflected from each symbol responsive to the scanning beam, the optical detector generating a detection signal responsive to the received optical energy; and a processing circuit coupled to the optical transmitter and the optical receiver, the processing circuit operable to process the detection signal for a corresponding information signal within the scan window to thereby read the information symbol;

wherein the processing circuit operates in a calibration mode to scan an optical mark recognition (OMR) calibration symbol, determine the position of the calibration symbol within the scan window, and determine a plurality of decoding parameters, each decoding parameter being associated with a particular cell in the OMR calibration symbol, and the processing circuit further operable in a decoding mode to determine the position of the a scanned OMR symbol in the scan window relative to the position of the calibration label and adjusting the decoding parameters as a function of the relative position of the scanned OMR symbol, the processing circuit thereafter applying each adjusted decoding parameter to the corresponding cell in the scanned OMR symbol to decode the scanned OMR symbol.

36. The symbol scanning device of claim 35 wherein the processing circuit includes a stored normalization look-up table including a plurality of records, each record including a scan sector field storing a corresponding scan sector and a normalization constant field storing a corresponding normalization constant, the processing circuit operable to assign each cell in the OMR calibration symbol a first normalization constant from the look-up table and operable to assign each cell in the scanned OMR a second normalization constant from the look-up table, and the processing circuit thereafter adjusting each decoding parameter for a respective cell as a function of the difference between the first and second normalization constants for the cell.

37. The symbol scanning device of claim 35 wherein each decoding parameter comprises a cell clock determined by dividing a cell count for the cell in the calibration symbol by a constant.

* * * * *

UNITED STATES PATENT AND TRADEMARK OFFICE
CERTIFICATE OF CORRECTION

PATENT NO.   : 6,502,750 B1                                             Page 1 of 1
DATED        : January 7, 2003
INVENTOR(S)  : Barnes et al.

It is certified that error appears in the above-identified patent and that said Letters Patent is hereby corrected as shown below:

Column 3,
Line 66, please delete "ONR" and insert -- OMR --.

Signed and Sealed this

Twenty-second Day of July, 2003

JAMES E. ROGAN
*Director of the United States Patent and Trademark Office*